Jan. 12, 1965  R. A. GRIJSEELS ETAL  3,165,702
SYSTEM SUPPLYING ELECTRIC PULSES IN CYCLIC
ORDER TO A NUMBER OF CIRCUITS
Filed Oct. 3, 1961  5 Sheets-Sheet 1
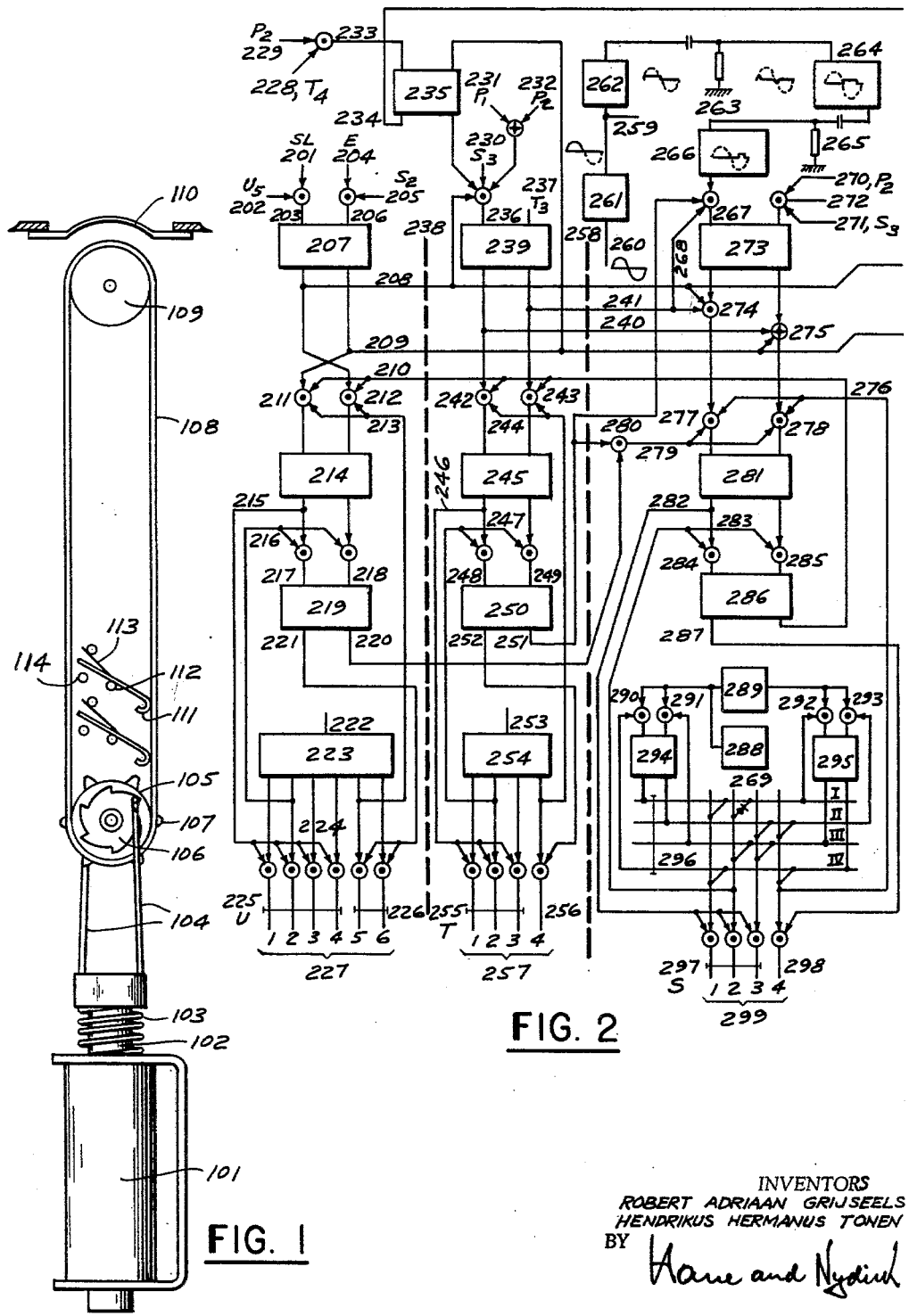
FIG. 2
FIG. 1
INVENTORS
ROBERT ADRIAAN GRIJSEELS
HENDRIKUS HERMANUS TONEN
BY
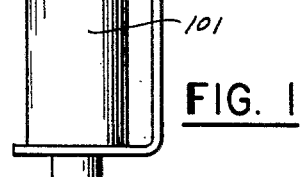
ATTORNEYS United States Patent Office 3,165,702
Patented Jan. 12, 1965

1

3,165,702
SYSTEM SUPPLYING ELECTRIC PULSES IN CYCLIC ORDER TO A NUMBER OF CIRCUITS
Robert Adriaan Grijseels and Hendrikus Hermanus Tonen, both of Hengelo, Overijssel, Netherlands, assignors to N.V. Hollandse Signaalapparaten, Hengelo, Netherlands, a firm of the Netherlands
Filed Oct. 3, 1961, Ser. No. 143,027
Claims priority, application Great Britain, Oct. 4, 1960, 33,996/60
7 Claims. (Cl. 328—75)

The invention relates to a system for successively supplying pulses in cyclic order to a number of output circuits.

Such systems are used to supply synchronizing pulses to electronic computers and electronic control circuits. It is the object of the invention to build such a system in such a way that it satisfies the following conditions:

(1) The pulses are supplied by a continuously operating pulse generator supplying the pulses in cyclic order to the output circuits.
(2) After the reception of a starting signal the system always supplies its first pulse to the output circuit which must receive the first pulse in a pulse cycle, and this pulse will have its full length independently of the moment of occurrence of the starting signal.
(3) When a stopping signal is received the system completes its cycle independently of the moment of occurrence of the said signal.

In order to satisfy these conditions according to the invention, the system is built in such a way that each output circuit possesses an electronic switch, such as a gating circuit or an "and" circuit, capable of suppressing the pulse supply by way of the output circuit, the said switches being divided for control purposes into two groups, each of which comprises at least one such electronic switch, the first group in any case comprising the switch controlling the pulse supply over the output circuit through which the first pulse of a pulse cycle flows and the second group in any case comprising the switch controlling the pulse supply over the circuit through which the last pulse of a pulse cycle flows, whilst a first bi-stable trigger circuit supplies a control voltage to a control circuit of each of the electronic switches of the first group, causing the said switches to permit the supply of pulses over the output circuits controlled by them if the trigger circuit is in its one condition (here to be called set condition) and to suppress the said supply of pulses if the trigger circuit is in its other condition (here to be called reset condition) and, moreover, a second bi-stable trigger circuit cooperates in the same way with the electronic switches of the second group, whilst, moreover, the first trigger circuit can be set by a trigger voltage applied to a setting control circuit and reset by a trigger voltage applied to a resetting control circuit, with this restriction, however, that each of the said control circuits possesses an electronic switch such as an "and" circuit or a gate circuit, a control circuit of which receives the pulses which are supplied by the system to a switch of the second group and occurring in a pulse cycle after the last pulse supplied in this cycle to a switch of the first group has been delivered, such a switch being only able to permit a trigger voltage to reach the trigger circuit whilst receiving such a pulse, whilst finally the first trigger circuit in its set condition supplies a trigger voltage suitable for setting the second trigger circuit to a setting control circuit of the second trigger circuit, and in its reset condition a trigger voltage suitable for resetting the second trigger circuit to the resetting control circuit of the second trigger circuit, each of the said control circuits for the second trigger circuit possessing an electronic switch, such

2 as an "and" circuit or a gate circuit, a control circuit of which receives the pulses supplied during a pulse cycle to an electronic switch of the first group before the first pulse applied during this cycle to a switch of the second group has been delivered, the said switches being only able to permit a trigger voltage to reach the second trigger circuit whilst receiving such a pulse.

At the moment a starting or stopping signal is applied to the setting or resetting control circuit of the first trigger circuit the said control circuits may be inactivated by the electronic switches. Nevertheless the loss of a starting or stopping signal can be prevented by building the system according to the invention in such a way that an auxiliary bi-stable trigger circuit is triggered into one condition by the starting signal and into the other condition by the stopping signal, whilst in the said one condition it applies a trigger voltage to the setting control circuit of the first trigger circuit and in the said other condition it applies a trigger voltage to the resetting control circuit.

As a rule electronic computers and control circuits comprise various synchronizing circuits for different synchronizing pulse frequencies. Such systems should never operate simultaneously. If systems according to the invention are applied for this purpose, simultaneous operation can be prevented by building the system in such a way that electronic switches belonging to the setting and resetting control circuit, or at any rate an electronic switch belonging to the setting control circuit of the first trigger circuit are dependent upon the condition of the second trigger circuit in every other system which must not operate simultaneously, as a result of a control voltage supplied by such a second trigger circuit, which control voltage only permits such an electronic switch to pass a trigger voltage to the first trigger circuit if the said control voltage is supplied by a second trigger circuit in its reset condition. To this end preferably each control voltage received from a second trigger circuit is applied to a separate control circuit of the electronic switch, or a control circuit of the switch receives the control voltages of the second trigger circuits on which it depends by way of one or more "and" circuits or gating circuits. In another embodiment the supply of pulses to such a switch is made dependent on the said control voltage(s) by means of one or more "and" or gating circuits. The electronic switches already present in the control circuit(s) can be used for this purpose.

In certain cases it may be desirable for a starting signal for a system to initiate the stopping of a system which must not operate simultaneously. According to the invention the auxiliary trigger circuit of a system supplies, in the condition in which it initiates the starting of its system, a voltage suitable for resetting the first trigger circuit of a system which must not operate simultaneously to the resetting control circuit of this trigger circuit, in order to initiate the stopping of the latter system. The said voltage can be supplied to the resetting control circuit by way of an "or" circuit.

Finally an auxiliary trigger circuit of a system which must not operate simultaneously with another system can be made inaccessible to a starting signal as long as the second trigger circuit of the other system is in the set condition or the auxiliary trigger circuit of this other system registers a starting signal, for which purpose the supply of the starting signal to the first mentioned auxiliary trigger circuit is made dependent on the condition of the second trigger circuit or of the auxiliary trigger circuit of the other system by means of an "and" or gate circuit.

Embodiments of the invention will now be elucidated by describing with reference to the drawings a control circuit of a display board comprising three systems according to the invention.

FIG. 1 shows a display unit used in the board;

FIG. 2 shows a circuit of three synchronizing systems according to the invention;

Figure 3:
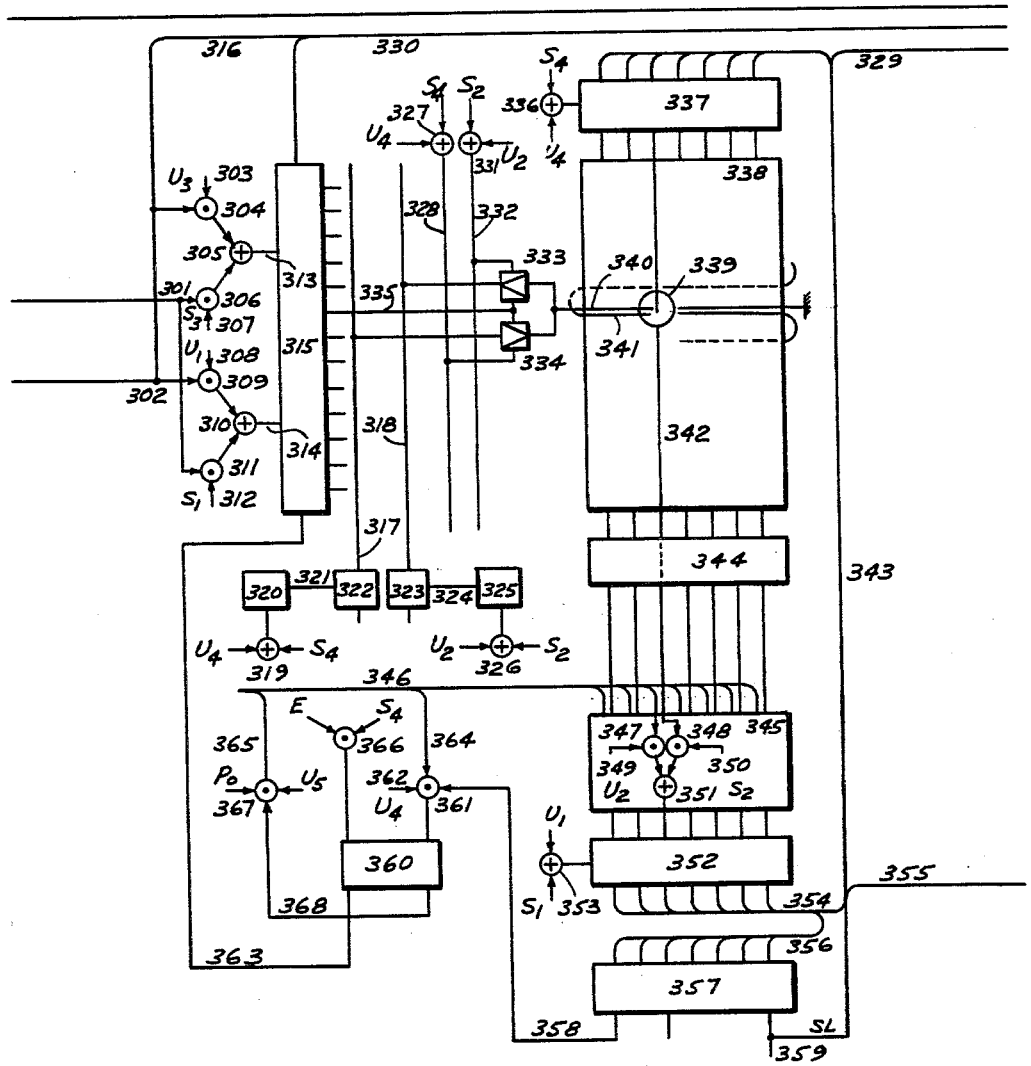
Figure 4:
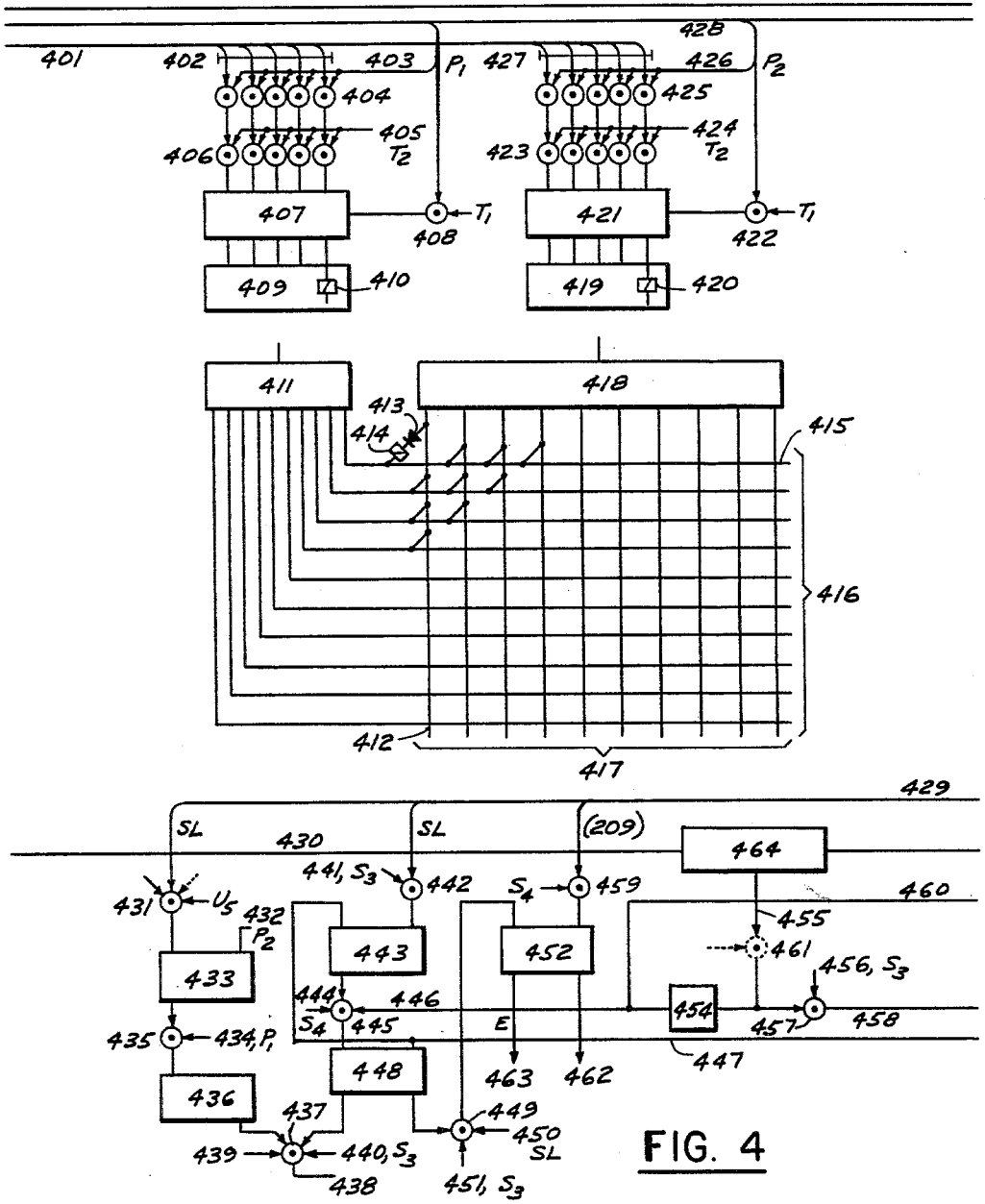
Figure 5:
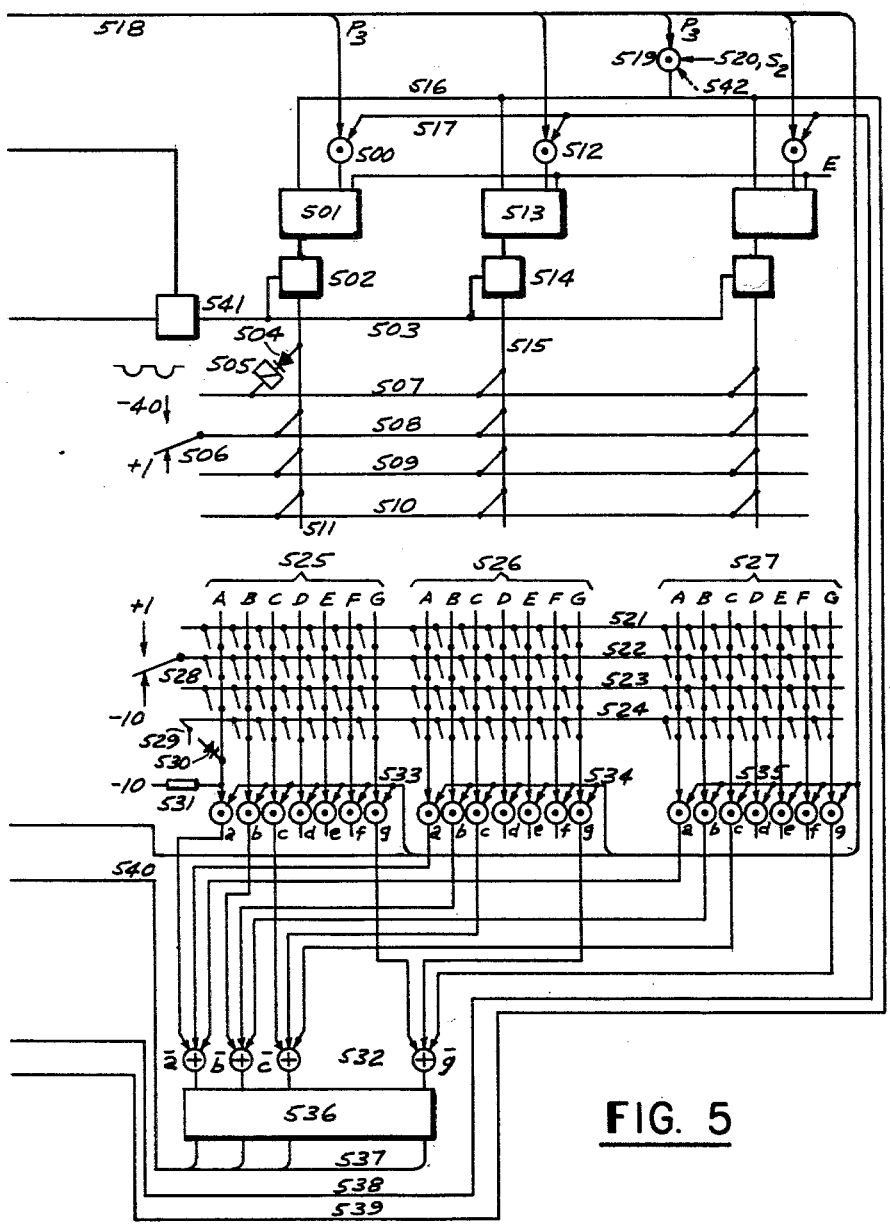
Figure 6:
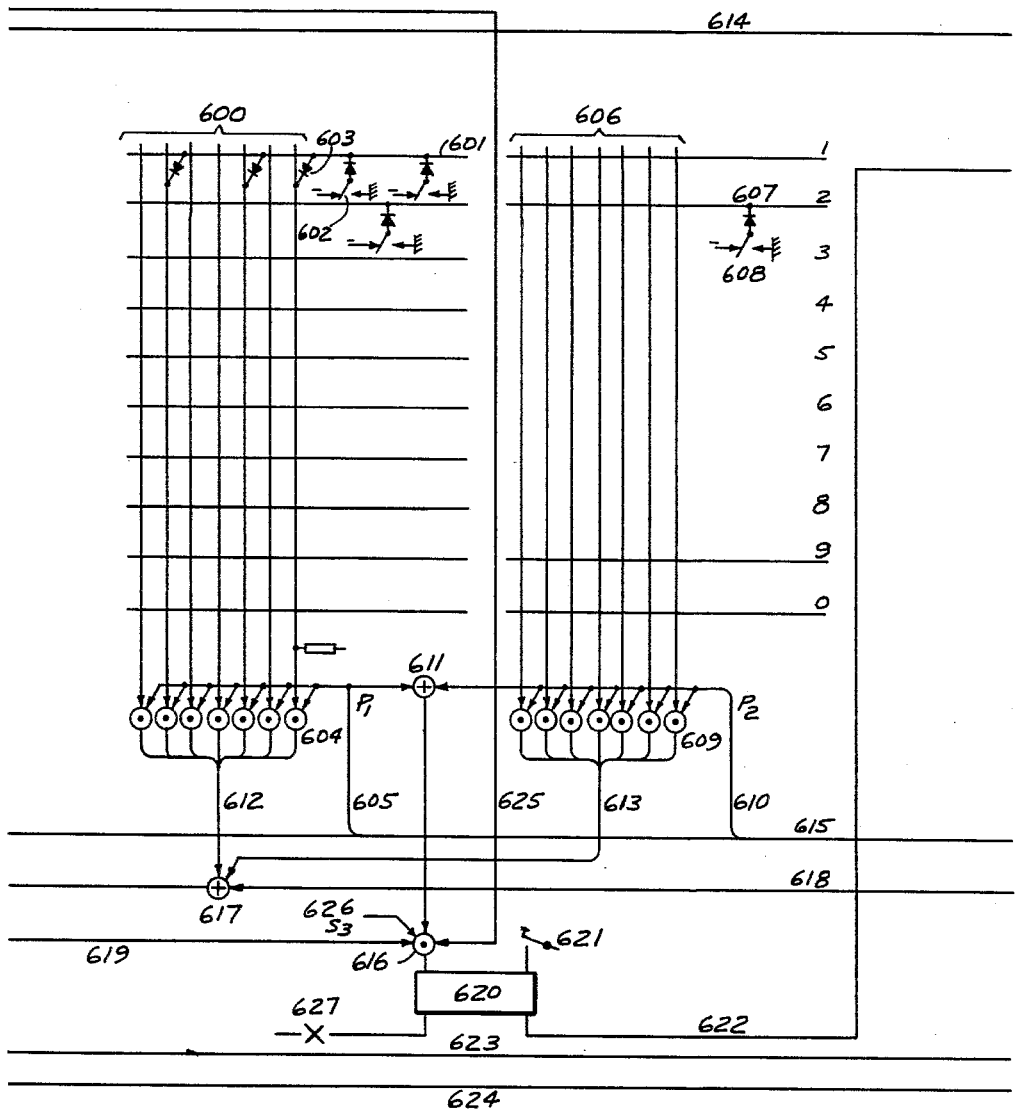

FIGS. 3, 4 and 5 arranged from left to right in this order show a circuit of the control system;

FIG. 6 shows a checking circuit system for the group selection; and

Figure 7:
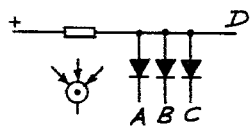

FIG. 7 shows an "and" circuit.

In the embodiments of the invention described below various components and circuits are used which are well-known in the art of building computer systems and described e.g. in the book by R.K. Richards: "Digital Computer Components and Circuits" (D. van Nostrand Company, Inc.). Said components and circuits will now be enumerated.

(1) *The "and" circuit shown in FIGURE 7.*—This circuit possesses a number of input circuits such as A, B, and C, each comprising a diode and an output circuit D. A voltage, which is at any rate higher than the voltages which are supplied to the input circuit, is connected by way of a resistance to the output circuit D. As long as the potential of the input circuits is low the output circuit will also have a low potential. If one or two of the input circuits have a high potential the diode in the input circuit with the lowest potential still remains conductive, so that the output voltage remains low. Only if all the input circuits have a high potential will the output voltage at D be high too. Instead of this "and" circuit, normal gating circuits comprising grid controlled electronic tubes can be applied. Its symbol is a circle with a point in its centre with arrow heads for the input circuits and a radial line with arrow heads for the output circuit (see 459, FIGURE 4 and FIGURE 7).

(2) The "or" circuit has the same character as the "and" circuit, but the direction of the diodes is reversed whilst a voltage, which is lower than both "bit voltages" is applied to the resistance. As long as the input circuits have a low potential the output voltage will also be low. As soon, however, as one of the input circuits obtains a high potential the diodes in the other input circuits are blocked, so that the output voltage becomes high.

"And" and "or" circuits are described on page 38 of the above mentioned book.

The "and" and "or" circuits described react to the occurrence of high voltage bits. If the circuits are to react to low voltage bits the "and" circuit described is suitable as an "or" circuit and the "or" circuit described can be used as an "and" circuit.

(3) *Trigger circuits or flip-flop circuits.*—A bi-stable trigger circuit is a circuit containing at any rate two voltage controlled electronic devices such as grid controlled electron tubes or transistors. The connections are such that if one of the devices conducts, it applies such a voltage to the control element of the other device that this other device is either blocked or carries a low current. Consequently this system has two stable states and cannot be in any other state. There are two input circuits or control circuits eventually connected to the two control elements of the two electronic devices e.g. to the grids of the two tubes, by which input circuits the state of the trigger circuit can be changed. If e.g. a negative pulse is applied to the grid of a conductive tube of a trigger circuit, the circuit is switched over. There are, as a rule, two output circuits, each, as a rule, connected to the anode circuit of one of the tubes if electron tubes are used. One of these output circuits has a high potential if the one condition of the circuit prevails whilst the other has a high potential in the other condition of the trigger circuit. Similar circuits are built with transistors, and in this case the switching is generally effected by applying a positive pulse to an input circuit. The symbol of a trigger circuit used in the figures of this specification is a rectangle with two input circuits entering it from above and two output circuits leaving it at the bottom. In the specification the following convention as to the conditions is accepted. One of the conditions is called the set condition, and the other the reset condition. The set condition is caused by applying a positive pulse to the left-hand input circuit, the reset condition by applying a positive pulse to the right-hand input circuit. In the set condition the lefthand output circuit has a high potential and the right-hand output circuit a low potential, whilst in the reset condition this relation is reversed. This circuit is the so-called bi-stable trigger circuit with two stable conditions. In some cases a mono-stable trigger circuit is used which, after being set, returns within a given time interval into its reset condition. In the drawings the same symbol is used for this circuit as well as for the bi-stable circuit. Both circuits are well-known in the art and described in the above mentioned book under the name of flip-flop circuit and in many other publications.

(4) *Magnetic matrix storage devices.*—The operation of these devices may be derived from the specification, whilst they are moreover described in chapter 8 of the above mentioned book.

(5) Magnetic drum storage devices which are also described in the above mentioned book e.g. on page 297 and in chapter 7. They are, moreover, well-known in the art.

(6) *The code recognizer.*—Various circuits may be used for this purpose and are well-known in the art. A short description of an example will be given. This example comprises a matrix circuit constructed more or less as the matrix shown at the lower right-hand side of FIGURE 2. For every bit in the code signals out of which certain signals must be recognized the matrix comprises two wires of the first type, one of which has a high potential if the bit is 1 and the other of which has a high potential if the bit is 0. These wires run through the matrix in one direction. For every signal to be recognized the matrix comprises a wire of the second type in the direction traverse to the first one, and this conductor is connected by a diode to each wire which obtains a high potential if the signal to be recognized is applied. This requires as many diodes for each of the wires of the second type as there are bits in the signals. The diodes are arranged according to an "and" circuit and consequently the said matrix wire will only obtain a high potential if the signal to be recognized is applied.

(7) *Code converters.*—Various constructions for these circuits are well-known in the art. They may consist of a combination of a code recognizer, comprising a wire for every possible signal which can be applied to the converter, and a transmitting matrix of the type described for transmitting back the number of the selected line selecting relay and shown in FIGURE 6. In this system each conductor for a certain signal in the recognizer matrix is connected to an input circuit of the transmitting matrix for this same signal. Other, and more simple converter circuits are, however, well-known in the art.

(8) *Comparison circuits.*—These circuits are well-known in the art of building computers, and need not be described in detail. In a possible embodiment the bits out of each pair of corresponding bits are applied to input circuits of an "and" circuit for this pair whilst the inverted bits are applied in a similar way to other "and" circuits. The output circuits thereof are combined by means of an "or" circuit and the output circuits of those "or" circuits are combined by "and" circuits in the case of equality of the code-signals.

The ring counter used in the system is of a well-known type and does not need description either. It may be derived from various publications.

The system according to the invention comprises many diode switching circuits such as "and" circuits, "or" circuits, matrix circuits, converter circuits, etc. The number of such circuits which can be connected in series is restricted. As soon as the maximum number of such switching circuits is reached, an amplifier is inserted between the last switching circuit of a series and the first of the next series. Cathode follower circuits or similar transistor circuits are suitable for this purpose. These amplifier circuits are not shown in the diagrams of the embodiments described in the specification. They may form part of converter circuits, comparison circuits, etc. The insertion of such an amplifier stage does not, however, change the principle of the system.

In various cases change in the level of control potentials will be necessary between a controlling and a controlled circuit. The means for this purpose are, as a rule, not shown but well-known in the art.

In the case of certain circuits being repeated many times in the system, only one of these circuits is shown more or less completely with all its diodes and resistances. If all these elements were shown in every part of the circuit it would become so complicated as to be unreadable.

The first embodiment described comprises a display board on which display units, each of which may show various numerals, letters or other signs are set under the control of a magnetic ring core storage system. The units are driven step by step, each of them by its own stepping magnet. The display board is used to show a number of similar data, such as stock quotations. The display units are arranged in lines. Each line shows information relating to a certain subject, such as the quotations for certain shares on different exchanges. The units on a line are set simultaneously. The system can, however, also be used for the simultaneous setting of one single group of units.

The display units applied in the system are no part of the invention, but the operation of the embodiments described can only be understood if the reader is acquainted with the operation of the type of display unit used, and therefore a short description of the operation of an example of such a unit will be given with reference to FIGURE 1. It will be obvious from the further description, however, that the application of the invention is by no means restricted to systems comprising units completely corresponding to the type of unit described by way of example. This unit comprises a stepping magnet 101 with a plunger core 102. The plunger core is driven upwards by a spring 103 and can be drawn downwards by the coil of the stepping magnet.

When moving up- and downwards the core drives, by means of resilient wire pawls 104, which are carried by a small support fixed to the plunger core, a drum 105, which is rotatable around an axis. Each of the pawls 104 possesses a part which is bent perpendicular to the plane of the drawing, and with these parts they cooperate with a ratchet wheel with internal teeth, such as 106, countersunk in the drum 105. The two pawls drive the drum in turn when the core moves up- and downwards. On its outer surface the drum 105 possesses sprockets 107, by means of which it drives an endless belt 108, provided with openings adapted to the sprockets. This endless belt passes at the other end of the unit over a freely rotatable pulley 109, which is situated immediately behind a small window 110 of the display board. The endless belt carries a number of signs on its outer surface. In each position of rest of the belt reached when the plunger core has returned to its position of rest, such a sign is shown behind the window 110. A code transmitter cooperating with the belt signals back the position reached by the belt, and consequently the sign shown behind the window. This code transmitter operates by means of feelers 111, which rest on the belt near its edges. Each of these feelers is rotatable around an axis 112, and carries a spring 113, resting against a pin, and tending to rotate the feeler to the left with its left-hand end against a contact pin 114. As long, however, as the feeler rests on the belt the left-hand end cannot reach this pin because the belt slides over and is supported by a metal strip 115. In the two tracks of the belt on which the feelers rest, recesses are present. If such a recess is under a feeler this feeler passes through this recess and a recess in the supporting strip so that the left-hand end of the feeler is able to reach the contact pin and closes a circuit connected to this pin. The unit used in the example described possesses 6 feelers near one edge of the belt. The track of the belt on which these feelers rest is provided with recesses, which are arranged according to a chain- or shifting code. In each position of rest of the belt these recesses cause the 6 feelers to close circuits in a certain combination, forming a code indication of the position of the belt and of the sign shown behind the window. The 6 feelers provide a binary code with 6 bits, permitting the belt to be adjusted in 64 and no more than 64 positions. Near the other edge of the belt one single feeler rests on the belt in a track in which such recesses are present that either in all possible positions of rest of the belt the number of circuits closed by all feelers is even, or in all possible positions the number of circuits closed by the feelers is odd. This 7th feeler permits the checking of the operation of the code transmitter and a warning to be given if incorrect signals are transmitted e.g. because of deficiencies in the feeler contacts or in the circuit connected to them. For this purpose a well-known type of circuit is connected to the feelers which is able to establish whether the number of circuits closed by the contacts is either even or odd, and gives an alarm signal if the condition in this respect is not satisfied.

The units on the display board are arranged in lines and columns. One end of a winding of the stepping magnet 505 (FIGURE 5) of each unit situated in a certain column of display units is connected to a wire 511, 515, allotted to this column. The other end of the winding of each display unit is connected to a wire which is allotted to the line on the display board in which the unit is situated (wires 507, 508 etc.). In this way the stepping magnet windings 505 are arranged in a matrix. A stepping magnet on the display board is excited by applying a voltage between the wire of the column and the wire allotted to the line on which the display unit is situated. In order to prevent the occurrence of currents in circuits in the matrix which are situated in parallel to the winding to be excited and which pass through windings which should not be excited, a diode, such as 504, is inserted in series with each winding. All these diodes have the same direction, which in the unit to be excited and selected by connecting certain wires to the current source corresponds to the direction of voltage and current, but prevents current from flowing in circuits parallel to this magnet.

If the units on a certain line are to be set, then the relay allotted to this line (e.g. 414, FIGURE 4) is excited. This relay switches over its contact 506 so that the wire allotted to this line (508) is connected to a source of pulses with a frequency of 50 cycles per second. The circuit for a certain stepping magnet of a display unit, e.g. the element situated in the first column and on the second line, is as follows: The positive terminal of the source of stepping pulses, the transistor switch 541, the wire 503, the transistor switch 502, the wire 511 allotted to the first column, the stepping magnet of the element in the first column and the second line, the wire 508 allotted to the second line, the relay contact 506, by means of which the second line is selected, and back to the negative terminal of the source of pulses. The circuits for the magnets of other display units have a similar character. The relay contact 506 selects the line, but does not close the circuits. This is effected by the transistor switches such as 502, 514, in the wires allotted to the columns. Such a transistor switch is controlled by a bi-stable trigger circuit such as 501 or 513. The control of the current in the stepping circuits by means of relay contacts would operate too slowly.

As has already been described above, each display unit possesses 7 code contacts for signalling back its position. One side of each code contact in an element situated on a certain line of the board is connected to a wire allotted to this line (521, 522, 523, 524). When this line, e.g.

the second line, is selected by closing the contact 506, for the purpose of setting the units on this line, the front contact 528 of the same relay connects the conductor 522, which is connected to the code contacts of all the display units of this line, to a source of voltage of +1 volt. In the position of rest this contact connects −10 volt to the same wire. Because of this change of voltage the contacts of the units on the said line are able to signal back their positions reached. A group of 7 multiple wires such as the group 525 connects the other sides of the corresponding code contacts of the units situated in the same column. The wire A e.g. connects all first code contacts, the wire B all second code contacts etc. In a similar way the multiples 526 and 527 connect the corresponding code contacts in the second and in the last column of display units. Each of the multiple wires connected to the code contacts of a certain column is connected to an input circuit of an "and" circuit (a–g) of well-known construction with two input circuits. The second input circuit of each "and" circuit in the same column is connected to a programming wire (533, 534, 535) for that column. The potentials which the code contacts of the unit on the selected line apply to the multiple wire of its column will only be able to pass the "and" circuit of this column if a potential differing from the quiescent potential is applied to the said programming wire by the programming circuit of the system. In the example described this programming circuit is a ring counter 315. The output circuit of each "and" circuit $a$, situated in the first multiple wire of each column, is connected to an input circuit of the "or" circuit $\bar{a}$ in the group of "or" circuits 532. Consequently the potential determined by the position of the first code contact of the unit situated on the line selected by the closed contact 528 and in the column in which the "and" circuits are made conductive by a suitable potential of the programming wire for this column appears at the output circuit of this "or" circuit. This potential corresponds to the first bit of the code signal, which indicates the position of the selected display unit. The 6 other "or" circuits $\bar{b}$–$\bar{g}$ supply the 6 other bits of the signal received from the code contact of the selected display unit.

The code in whcih the code transmitter of a display unit signals back the position of the unit by means of 6 feelers resting on a track near one edge of the belt is of necessity a so-called shifting or chain code, in which two successive signals differ therein, that the bit at one end of the signal has disappeared, all other bits have been shifted one position in the direction of this lost bit, whilst at the other end of the signal a bit has been added. The setting of the units is controlled by means of a binary code. This code is not subjected to the restrictions imposed upon a shifting code. It may be a well-known standard code such as a teleprinter code. If a display unit possesses 6 code contacts 64 different signals may be arranged from the 6 bits supplied by these contacts. If this unit must be able to be set in 64 different positions, in each of these positions one of the 64 different code signals is transmitted, and the signs on the belt may be arranged in such a way that if a certain sign is shown behind the window the code transmitter transmits that code signal which corresponds to the said sign in the 6-bit code in which information is supplied to the display board. If the information is supplied in teleprinter code, 5 of the bits produced by the code transmiter must correspond to the 5 significant bits of the teleprinter code, whilst the 6th bit must correspond to the shift-key signal, which shows whether either a letter, or a numeral or sign is transmitted. If, however, the number of signs to be shown is substantially lower than 64, or at any rate lower than the number of signals which may be arranged with the bits produced by the code transmitter, it is undesirable to build the unit with a position of rest for each of these signals, because this would increase the setting time. If, however, the number of positions of rest is smaller than the number of signals wihch can be arranged with the number of code contacts, the restrictions imposed upon the shifting code will have the following result; the signals produced by the code transmitter cannot, as a rule, be adapted to any existing code, such as a teleprinter code, supplied to the display board. In this case a code converter must be applied. In the example described, such a code converter (536) is connected immediately behind the "or" circuits 532. This code converter converts the code produced by the display units into the code in which the signals are stored in the storage arrangement of the system, which controls the setting of the display units.

The code transmitter contacts of all the display units of the display board are arranged in a large matrix circuit. In this circuit contacts of units other than the one selected and situated in other columns are apt to apply potentials to the multiple code wires of the column of the selected unit. In order to prevent this application of the wrong potential, a diode, such as 530, is connected in series with each of the code contacts, such as 529. The direction of these diodes is the same for all contacts and corresponds to the voltage direction in the code circuits. In this way all by-pass circuits are blocked.

The setting of the display units in the example first described is controlled by a magnetic core matrix storage arrangement 338 (FIGURE 3) in which the signals which indicate the desired settings of the different units of a line on the board are temporarily stored. The core matrix possesses a large number of ring-shaped cores of magnetic material, such as 339. These cores are arranged in lines and columns. Each line, (horizontal in the drawing) is used to store the setting of one single unit. For each line of the matrix a wire such as 340 is arranged so as to pass through all cores of that line. This wire is called the line selecting wire and is used to select the said line. For this purpose a current is caused to flow through this line. The strength of this current is such that the strength of the magnetic field generated by this current in a core enclosing the wire is equal to ⅔ of the field strength necessary for causing the core to be magnetized to the extent required for storing a bit. This current has one direction for writing and the opposite direction for reading the line. The matrix possesses 7 columns. A reading and writing wire such as 342 passes through all the cores situated in the same column. This wire is used for writing (storing data in the matrix) as well as for reading (receiving stored information from the matrix). For writing only, a substantial current is caused to flow in this wire and this current has such a strength that the field generated in each core enclosing this wire has a strength which is substantially equal to the strength of the field generated by the current in the selecting wire. Furthermore a bias wire 341 is carried through all the cores of the matrix. In this wire an unvarying current flows which generates a field in all the cores the strength of which field is half that of the field generated by the current in one of the other wires. Because of the shape of the hysteresis loop of the magnetic material of the cores (which, as a rule, is a ferrite) this current effects no perceptible change in the state of magnetization of a core.

Be it assumed that a line of the core matrix must be read. A current is then caused to flow through the selecting wire 340 of this line with such a direction that the field caused by the bias wire and the field caused by the selecting wire have the same direction. The total field in the cores of the selected line will then be sufficient to cause each core which at that moment is magnetized in the opposite direction to reverse its magnetization suddenly. This cause s a voltage pulse to be induced in the reading and writing wire 342 passing through such a core. After the reading of the line all cores are magnetized in the same direction, the direction of the quiescent magnetization. A core magnetized in this way is said to store a "0 bit" and does not cause a voltage to be induced in the reading wire whilst reading is effected. If on the other hand a signal must be written on the said line first a reading operation is performed causing all cores to obtain the quiescent magnetization, after which a current with such a direction is caused to flow in the selecting wire that the field generated by it opposes the field generated by the bias wire. The field caused by the selecting wire will, moreover, dominate, but will be insufficient to cause a perceptible change in the magnetization. If nothing more happens the cores on the line maintain their quiescent magnetization and store a "0 bit." In order to write a 1 bit in a certain core a current is caused to flow in the reading and writing wire passing through said core, which has such a direction that the field generated by it in the core has the same direction as the field already generated in the core by the resulting field from bias and selecting wire and possesses the strength mentioned above. A core, situated on the intersection of the reading and writing wire and the selecting wire, will then be magnetized in a direction which is opposite to the direction of the quiescent magnetization. Such a core will induce a pulse in the reading wire passing through it when the line in the matrix on which it is situated is read. During the writing operation the current in the selecting wire 340 is supplied by way of a transistor switch 322, which is able to effect switching operations whilst carrying this current, and which is common to all selecting wires. It flows through a common supply wire 317, and a transistor switch 334, which is individually allotted to the selecting wire but which is not able to close or break the current without being damaged. During the reading operating the current flows from the selecting wire through a transistor switch 333 individually allotted to the selecting wire, but unable to close or break the current, a common wire 318 and a common transistor switch 323 which is able to effect switching operations under current. A line in the core matrix is selected by means of a counter e.g. a ring counter circuit 315 of well-known construction, which needs no further elucidation. It successively applies a switching voltage to each of the different wires 335 allotted to the lines of the storage matrix. These switching voltages are applied to both transistor switches 333 and 334 allotted to the line selected by the ring counter, but are insufficient to make these switches conductive. For the purpose of making such a switch conductive a control voltage must also be applied to its second controlling circuit, e.g. because such a transistor switch is controlled by way of an "and" circuit. During the writing operation such a voltage is applied by way of the common wire 328, on which a pulse appears at the writing moment, to all writing transistor switches, such as 334. Only the transistor switch selected by the ring counter can be made conductive, however, by this pulse. For the purpose of reading a switching voltage is applied by way of the common wire 332 to all transistor switches such as 333 used for reading. This pulse will only be able to make that transistor switch 333 conductive which is selected by the ring counter 315. Shortly after the appearance of the switching pulse on the wire 328 a switching pulse is applied to the control input circuit 321 of the transistor switch 322, causing this switch to close a current in the writing direction in the selecting wire 340 indicated by the ring counter. Just before the end of the switching pulse applied to the wire 328 the switching pulse voltage is removed from the control input circuit 321. Consequently the current in the selecting wire is not closed and broken by the transistor switch 334 but by the common transistor switch 322. In a similar way, whilst reading, the current is closed and broken by the transistor switch 323 as a result of a switching pulse applied to the control input 324, which switching pulse is comprised in the interval occupied by the switching pulse applied to the wire 332.

The display board in the first embodiment described used three sources of synchronizing pulses. Whilst receiving information from extraneous sources the circuit must be controlled by synchronizing pulses supplied by the source of information, causing the synchronization to correspond to the signals supplied to the board. For internal switching operations an internal source of synchronizing pulses, supplying pulses of a very high frequency, is applied. A source of slow synchronizing pulses is, moreover, used to control the excitation of the line selecting relays of the display board. Each of these sources of synchronizing pulses applies pulses in a cyclic order to a number of synchronizing wires. When switching over from one source of synchronizing pulses to another source care must be taken that the source which is switched off completes its last cycle, and that the source which is switched on always starts at the beginning of a cycle, whilst, moreover, overlapping operation of two sources of synchronizing pulses must be avoided. Circuit arrangements for this purpose will be elucidated whilst describing the complete system.

After describing the operation of certain parts of the display board and its control circuit, the setting of a piece of information on a certain line of the display board of the first embodiment will now be described in detail. This description will refer to the FIGURES 2, 3, 4 and 5 which should be arranged from left to right in this order in order to obtain a circuit of the complete system. In order to facilitate the reading of the drawings the first figure of any numeral used as an index is equal to the number of the figure, so that no figure numbers need to be quoted in the description.

It is assumed that the display board and its control circuit are in rest. The display board receives information according to which it is to be set by way of a communication channel, consisting of a number of wires 346 and which is carried along various display boards and other apparatus to which information must be supplied. The board or apparatus which is to react to a certain piece of information is selected by transmitting a call sign. The signs used for call sign are, however, also used as signals whilst transmitting information, so that special measures are required to indicate when such a signal is used as a call sign. In the example described a pulse voltage is applied for this purpose to a special wire 364 in the communication channel. The communication channel 346 comprises 7 wires for simultaneously transmitting the bits of a signal. It comprises, moreover, a number of wires through which synchronizing pulses are supplied. It is assumed that extraneous synchronizing pulses are supplied to the various parts of the circuit by means of 6 wires to which pulses are applied in a cyclic order. These pulses pass through the device 223 to the 6 output circuits combined into the group 224. It is possible for the communication channel to contain 6 wires 222 for the transmission of the extraneous synchronizing pulses. The device 223 then only comprises connections for these wires and, if necessary, amplifiers. If the communication channel has a conisderable length it will be important to reduce the number of wires, and it is possible to transmit the synchronization information by means of 3 wires. Some of the 6 pulses will then be indicated by the combined presence of pulses on more than one of these 3 wires. The device 223 in this case comprises a decoding circuit of well-known type and of the same character as the decoding circuit which will be described in connection with the source of rapid synchronizing pulses.

If the extraneous synchronization is operative, the trigger circuit 207 is reset, and the trigger circuits 214 and 219 are set. Consequently the potentials of the wires 215 and 221 are high so that the four "and" circuits 225 and the two "and" circuits 226 will be able to pass the extraneous synchronizing pulses to the output circuits $U_1$, $U_2$, $U_3$, $U_4$, $U_5$ and $U_6$. Because the trigger circuit 207 is reset, the potential of the wire 309, 302 is high, so that the "and" circuits 303 and 304 are conductive and the ring counter 315 receives the first and the third extraneous synchronizing pulse $U_1$ and $U_3$ by way of the conductors 314, 313, the "or" circuits 310 and 305, the "and" circuits 309 and 304 and the input circuits 308 and 303. These pulses cooperate in a well-known way to control the ring counter circuits, the first synchronizing pulse causing the counter to step. For the time being this counter remains in its position of rest, because the trigger circuits of the ring counter are compelled to remain in their reset condition by a potential applied to the wire 363. This potential is supplied by the trigger circuit 360 in the set condition. As will be described later on this trigger circuit is set at the end of a setting cycle of the display board. The 7 wires in the channel 346 which carry the bits of the signals are connected to the gating system 345. This gating system is shown in detail for the third wire. By means of an "and" circuit 347 and an "or" circuit 351 this gating system can connect the said third wire to the third trigger circuit in a flip-flop register 352. A pulse on the said third wire sets the third trigger circuit. During the reception of the signal the "and" circuit 347 is made conductive for a short interval by the second extraneous synchronizing pulse $U_2$, which is applied to the input circuit 349 of the "and" circuit 347. Before the bits of the signal are able to reach the trigger circuits in the register these trigger circuits have all been reset by the first extraneous synchronizing pulse $U_1$, which reaches them through the "or" circuit 353. For this purpose the input circuit by means of which it can be reset of each trigger circuit in the register is connected to the output circuit of this "or" circuit. The reception of the bits of the signals consequently sets the trigger circuits in the flip-flop register in accordance with the signal received. In this phase of the operation only the code recognizer circuit 357 reacts to the setting of the flip-flop register. If the signal by means of which the display board is selected is received, the code recognizer circuit applies a high voltage to the output circuit 358. As a rule this has no effect, for the signal may be part of information supplied to any other apparatus connected to the common channel. During the transmission of a call, however, a special wire in the channel used to announce the selection operation applies a high potential to the input circuit 364 of the "and" circuit 361. The 4th extraneous synchronizing pulse $U_4$ which is applied to the input circuit 362 of the "and" circuit 361 will then pass this "and" circuit and reset the trigger circuit 360, which makes the potential of the conductor 363 low and thus permits the ring counter to leave its position of rest. The display board is now ready for the reception of information. Before the end of the synchronizing cycle in which the selection is performed this readiness for reception is signalled to the distant sender by sending the 5th extraneous synchronizing pulse back to it by way of a special wire comprised in the common channel 346 and connected to the "and" circuit 367. The said 5th pulse is applied to an input circuit of said "and" circuit, but is only able to pass this "and" circuit if two conditions are met: (1) the control circuit is at rest, for only in this case does the second input circuit connected to the programming wire $P_0$ have a high potential, (2) the board is called, for only then is the trigger circuit 360 in the reset condition, causing the 3rd input circuit of the said "and" circuit to have a high potential. For the distant sender the reception of the said 5th pulse is the signal that the selected display board is ready for reception, to which signal it reacts by starting the transmission of information. If desired the special wire 365 may be connected to the same wire 364 in the common channel 346, through which, during the appearance of the 4th synchronizing pulse, the making of a call was announced. If the selected display board was occupied, e.g. because it was setting its units in accordance with information previously received, then the flip-flop register 352 would not have been able to receive the call sign because the extraneous synchronization would have been inoperative. No pulse would in this case have been retransmitted to the distant sender. The sender then knows that no connection with the display board has been obtained, does not transmit information, and repeats the call. During the following cycle of the synchronization the next signal is received. At the occurrence of the first synchronizing pulse in this cycle the ring counter, which is no longer compelled to remain at rest, switches over to its first position in which it permits the transistor switches 333 and 334 of the first line in the storage matrix 338 to become conductive. Furthermore, the flip-flop register 352 is reset by the pulse $U_1$. In the second interval of the extraneous synchronization, i.e. at the occurrence of the pulse $U_2$, the trigger circuits in the register 352 are set in accordance with the bits of the received signal which flow through "and" circuits such as 347. The code recognizer 357 is no longer able to initiate any switching operation when receiving the own call sign because the special wire 364 remains at a low potential. In the second interval, moreover, the first line of the matrix is read. The 2nd pulse $U_2$ reaches the conductor 332 by way of the "or" circuit 331 and causes the reading switch 333 of the said first line, selected by the ring counter, to become conductive. Furthermore, the pulse $U_2$ is applied to the pulse shaper 325 by way of the "or" circuit 326. The pulse shaper then produces a pulse which is comprised within the interval occupied by the 2nd synchronizing pulse. This short pulse causes the transistor switch 323 to become temporarily conductive, thus causing a pulse to flow in the selecting wire for the first line. In the example described the pulse shaper 325 consists of a blocking oscillator which is triggered by the 2nd synchronizing pulse to generate a pulse of the required duration. The operation described above causes the first line in the matrix to be read in the way already described, and all the cores of this line to be reset. Because the rapid synchronization is not operative the pulses generated whilst reading the matrix cannot pass the "and" circuits such as 348 in the gating system 345 and will not influence the flip-flop register 352. In the 4th interval the 4th extraneous synchronizing pulse $U_4$ reaches the conductor 328 through the "or" circuit 327, so that the writing switch 334, allotted to the selected line, becomes conductive. Moreover, a pulse passing through the "or" circuit 319 reaches the pulse shaper 320, which is a blocking oscillator also, and provides a pulse which is just a little shorter than the original pulse and is comprised within the interval occupied by this pulse. This pulse, supplied by the blocking oscillator, causes the transistor switch 322 to become conductive for a short interval, so that a short pulse in the writing direction is caused to flow in the selecting wire 340 of the first line of the matrix. Moreover, by way of the "or" circuit 336 the 4th extraneous synchronizing pulse reaches all writing amplifiers comprised in the system 337, causing these amplifiers to become operative, so that pulses corresponding to the setting of the flip-flop register 352 will flow in the writing and reading wires such as 342 of the core matrix. The setting of the flip-flop register is in this way transferred to the first line of the core matrix by way of the cable 354, 343 and the amplifier 337. This operation is repeated for all signals received. Each signal is written on the following line of the matrix. The last signal is a special signal, reserved for indicating the end of the piece of information transmitted, and will be called clearing signal. This signal is recognized by the code recognizer 357 which continuously watches by way of the cable 356, 354 the setting of the flip-flop register 352. If the code recognizer receives the clearing signal it applies a high potential to its output 359. This causes the input circuit 201 of the "and" circuit 203 to obtain a high potential so that the extraneous synchronizing pulse $U_5$, applied to the second input circuit 202 of the "and" circuit can pass the latter circuit and set the trigger circuit 207. This causes the conductor 209 to obtain a low potential, which interrupts the supply of extraneous synchronizing pulses to the ring counter 315 through the "and" circuits 304 and 309. Because the trigger circuit 207 is set and the trigger circuit 286 is reset and, consequently, the conductor 210 has a high potential the said 5th extraneous synchronizing pulse is able to pass the "and" circuit 212 and to reset the trigger circuit 214. The trigger circuit then applies a low potential to the conductor 215, causing the "and" circuits 225 in the first 4 output circuits $U_1$, $U_2$, $U_3$ and $U_4$ of the extraneous synchronization circuit to become non-conductive. The extraneous synchronization nevertheless finishes its cycle because the last two "and" circuits 226 are still conductive. As soon as the 6th pulse is supplied, however, no further pulses are supplied. The second pulse in the next cycle, which does not reach the output wires 227 any more, still flows by way of the conductor 216 to the "and" circuits 217 and 218. Because the reset trigger circuit 214 applies a high potential to the upper input circuit of the "and" circuit 218, the said pulse passes this "and" circuit and resets the trigger circuit 219. This trigger circuit then causes the potential of the conductor 221 to become low so that the "and" circuits 226 also become non-conductive and the supply of extraneous synchronizing pulses is completely interrupted.

As will be described later on the trigger circuit 273 is set at this moment. As, moreover, the trigger circuit 239 is reset and the conductor 241 consequently has a high potential, the application of a high potential to the set at this moment. As, moreover, the trigger circuit 207 results in the application of a high potential to the upper input circuit of the "and" circuit 277. The trigger circuits 219 and 250 are in the reset condition so that the two input circuits of the "and" circuit 280 have a high potential. Consequently, the conductor 279 and the left-hand input circuit of the "and" circuit 277 have a high potential. The conductors 269 apply the rapid internal synchronizing pulses to the "and" circuits 297 and 298. When the 4th of these pulses, $S_4$, is applied to the input circuit of the nonconductive "and" circuit 298 it also reaches, by way of conductor 276, the right-hand input circuit of the "and" circuit 277 and, because of the high potentials of the other input circuits, is able to pass it, and to set the trigger circuit 281. This causes the conductor 282 to obtain a high potential so that the 3 "and" circuits 297 in the rapid synchronization conductors $S_1$, $S_2$ and $S_3$ become conductive, and the first three pulses of the rapid internal synchronization are able to pass. As soon as the second pulse appears, the conductor 283 applies it to the left-hand input circuit of the "and" circuit 284. It passes this circuit because of the high potential applied to the upper input circuit by trigger circuit 281 in its set condition and sets the trigger circuit 286. This trigger circuit then applies a high potential to the conductor 287, causing the "and" circuit 298 to become conductive. From that moment on the soure of rapid synchronizing pulses supplies all 4 rapid synchronizing pulses to the system. Because the trigger circuit 207 is set, and consequently the conductor 208, 301 has a high potential, the ring counter 315 receives by way of the "and" circuits 311 and 306, the "or" circuits 310 and 305 and the conductors 314 and 313 the first and the 3rd rapid internal synchronizing pulse, which are applied to the input circuits 312, 307 of the "and" circuits. These pulses cause the counter to step. It passes over all lines of the matrix on which no signals have been written. This has no further effect. The presence of such lines may be important. The lengths of all lines on the display board are not necessarily the same and the storage matrix must be large enough to control the setting of the longest line. For controlling the setting of a shorter line on the board not all lines in the storage matrix will contain information, and signals still present as a result of previous control cycles on lines in the matrix on which no information has been written during the last reception period will be ignored, because no corresponding display units are present on the selected shorter line of the board. In each of its positions the ring counter not only applies a voltage to a selecting conductor 335 of the core matrix, but also to a programming wire in the programming wire group 330. Such a programming wire will be indicated by the number of the position of the counter in which a special potential is applied to it (e.g., $P_4$, $P_5$ . . . ). The current in the selecting wires of the matrix is controlled by the 2nd and 4th internal synchronizing pulse in a way similar to that in which it is controlled by the extraneous synchronization during the reception of information from the common channel. In this case, however, the reading of a line does influence the setting of the flip-flop register 352 because now the second rapid synchronizing pulse $S_2$ is applied to the input circuits 350 of "and" circuits, such as 348 in the gate circuit system 345, making these circuits conductive, so that the pulses induced in the conductors 342 whilst reading and amplified by the reading amplifier 344, are able to set the trigger circuits in the flip-flop register in accordance with the bits written on the line which is read. Just before the reading operation is performed the synchronizing pulse $S_1$ is applied by way of the "or" circuit 353 to the register causing all trigger circuits in the flip-flop register to be reset.

After the reading of a line the information is removed from the line of the core matrix, but at the occurrence of the 4th rapid synchronizing pulse $S_4$ which is applied to the writing amplifier 337 by way of the "or" circuit 336, this information is received from a flip-flop register again and is rewritten on the said line. After passing over the lines on which no information has been written the counter continues its stepping operation. It then successively selects the lines in the matrix on which information has been written. The programming wire $P_1$ for the first line is connected to the input circuit 231 of the "or" circuit 230, so that the right-hand input circuit of the "and" circuit 236 obtains a high potential when the first line is selected. Because the trigger circuit 207 is set, which means that the extraneous synchronization system is inoperative, the wire 238 and the input circuit of the "and" circuit 236 connected to it has a high potential. Moreover, the trigger circuit 235 is still in the reset condition so that the upper left-hand input circuit of the "and" circuit 236 also has a high potential. As soon as the rapid synchronizing pulse $S_3$ appears at the upper input circuit of this "and" circuit the trigger circuit 239 will consequently be set. This has various consequences. The conductor 240 obtains a high potential, so that by way of the "or" circuit 275 the upper input circuit of the "and" circuit 278 receives a high potential. As, moreover, the trigger circuits 219 and 250 are in the reset condition, the left-hand input circuit of this "and" circuit also obtains a high potential by way of the "and" circuit 280. The 4th internal synchronizing pulse $S_4$ applied to the wire 276 will, therefore, be able to pass the "and" circuit 278 and to reset the trigger circuit 281. This causes the wire 282 to obtain a low potential and the "and" circuits 297 to become non-conductive, so that the first 3 pulses of the rapid synchronization will be unable to pass. The second synchronizing pulse, which is unable to pass the second "and" circuit 297 is nevertheless still applied by way of conductor 283 to the left-hand input circuit of the "and" circuit 285 and as the upper input circuit of this "and" circuit has obtained a high potential as a result of the resetting of the trigger circuit 281 the said pulse can reach the trigger circuit 286 and reset it. This causes the conductor 287 to obtain a low potential, so that the "and" circuit 298 in the 4th output circuit of the rapid internal synchronization circuit becomes blocked. The internal synchronization has then become inoperative.

The resetting of the trigger circuit 286 applies a high potential to the conductor 210. The setting of the trigger circuit 239, moreover, applies a high potential to the upper input circuit of the "and" circuit 242. The 4th pulse of the slow synchronization, although unable to pass the "and" circuit 256 will under these circumstances reach the left-hand input circuit of the trigger 245 by way of conductor 244 and the "and" circuit 242 and set it. This supplies the conductor 246 with a high potential so that the first 3 "and" circuits 255 in the output circuits of the slow synchronization circuit become conductive and the first 3 slow synchronizing pulses are able to pass. The trigger circuit 245 in its set condition applies a high potential to the upper input circuit of the "and" circuit 248. The 2nd slow synchronizing pulse supplied by way of conductor 247 will then be able to pass this "and" circuit and to set the trigger circuit 250. In its set condition the trigger circuit applies a high potential to its output circuit 252, thus making the "and" circuit 256 in the 4th output circuit of the slow synchronization circuit conductive. The slow internal synchronization is then operative. Its object is to control the setting of the selecting relays. These relays must be set in accordance with the information written on the first and second lines of the storage matrix. The relays are electromechanical relays and consequently operate relatively slowly, so that their operation cannot be controlled by rapid synchronizing pulses suitable for the control of trigger circuits. The signal which was transferred from the first line in the storage matrix to the flip-flop register 352 during the previous cycle of the rapid synchronization is still present in this register when the slow synchronization starts its operation because since the registration no pulse $S_1$ or $U_1$ has occurred. The output circuits of the 5 trigger circuits set in accordance with the significant bits of the signal are connected by way of the cable 354, 343, 329, 401 to the 5 conductors 402. These conductors pass the "and" circuits 404. One input circuit of each of these "and" circuits is connected by way of conductor 403 to the programming wire $P_1$ to which a high potential is applied when the ring counter 315 is in its first position, in which it selects the first line of the core matrix, so that these "and" circuits are able to pass the bits received from the register 352 when the first line of the matrix has just been read. A second set of "and" circuits 406 is inserted in the conductors 402. One input circuit of these "and" circuits is connected to the conductor 405 to which the second internal slow synchronizing pulse $T_2$ is applied, so that the information, received from the first line in the matrix and now stored in the register 352 is transmitted to the relay amplifier 407 at the occurrence of the said pulse $T_2$. Each of these relay amplifiers is terminated by a bistable trigger circuit. In each of these trigger circuits a connection in which a sufficient current flows only in the set condition of the trigger circuit, passes through the winding of a selecting relay, such as 410, in the relay group 409. Such a relay will, therefore, be excited when its trigger circuit is set. The trigger circuits are previously reset by the first slow internal synchronizing pulse $T_1$ of a cycle. This pulse is supplied to the group 407, through the "and" circuit 408 so that it can reach the group only if the first line in the matrix is selected and consequently the first programming wire $P_1$, which is connected to one of the input circuits of this "and" circuit possesses a high potential. This resetting operation is, therefore, not repeated any more during the rest of the operation, because either the pulse $T_1$ or the potential on the wire $P_1$ will be absent, or both. At the end of the slow synchronization cycle the trigger circuits in the system 407 are in the set or reset condition, and the relays 410 in the system 409 excited or non-excited in a combination which corresponds to the signal written on the first line of the core matrix.

The 3rd slow synchronizing pulse $T_3$ is applied to the right-hand input circuit of the trigger circuit 239 and causes this trigger circuit to be reset. In the way already described before for another synchronization system this puts an end to the operation of the slow synchronization as soon as it has finished its cycle. No new cycle of the slow synchronization will be started because of the reset condition of trigger circuit 239. The trigger circuits 207 and 273 are set, so that two of the input circuits of the "and" circuit 274 have a high potential. As soon as the trigger circuit 239 is reset also the 3rd input circuit of this "and" circuit obtains a high potential by way of the conductor 241. This causes the central input circuit of the "and" circuit 277 to receive a high potential. Because the external synchronization is non-operative the conductor 220 has a high potential and in order to switch off the slow synchronization, the trigger circuit 250 is reset so that a high potential is applied to the conductor 251. The "and" circuit 280 then applies a high potential to the conductor 279 and the left-hand input circuit of the "and" circuit 277. The next 4th rapid synchronizing pulse, applied to the conductor 276 will then be able to pass the "and" circuit 277 and to set the trigger circuit 281. This starts in the way already described a cycle of the internal rapid synchronization system. A cycle of this system is then performed during which the contents of the second line of the core matrix is transferred to the register 352. Because also the second programming wire $P_2$ is connected to an input circuit 232 of the "or" circuit 230 again a cycle of the slow synchronization is started as soon as the cycle of the rapid synchronization is completed. During this cycle by way of the wires 427, the "and" circuits 425 connected by way of conductor 426 to the programming wire $P_2$ and the "and" circuits 423, made conductive by the second slow synchronizing pulse $T_2$ applied to the conductor 424, the trigger circuits in the system 421 are set in accordance with the contents of the second line of the core matrix. These trigger circuits were previously reset by the slow synchronizing pulse $T_1$, which, because of the high potential of the programming wire $P_2$, applied to the upper input circuit of the "and" circuit 422, this once is able to pass the said "and" circuit. At the end of the second slow synchronizing cycle the relays 420 in the group 419 are set in accordance with the bits written on the second line of the core matrix. The slow synchronizing system remains inoperative for the rest of the setting so that the trigger circuit in the group 407 and 421 will no more be reset. Consequently the relays in the groups 409 and 419 which are excited during the first part of the setting operation of a line of units on the board remain excited for the rest of this operation. The relays in the group 409 control the contacts of the contact pyramid 411 and the relays in the group 419 control the contacts in the contact pyramid 418. The contact pyramid 411 connects one of the 10 horizontal conductors 416 of a relay matrix to one terminal of a source of current. The relay contact pyramid 418 connects one of the 10 vertical conductors 417 of the same matrix to the other terminal of the said source of current. Between each pair of wires the winding of a relay is connected. Between the horizontal wire 415 and the vertical wire 412 e.g. a relay winding 414 is connected. In order to prevent the closing of undesired parallel circuits in the matrix a diode such as 413 is connected in series with each relay winding such as 414. After the two relay groups 409 and 419 have been set only one relay in the relay matrix is excited. The relays in this matrix are the line selecting relays performing the selection of the line to be set of the display board in the way already described with reference to FIG. 5.

At the end of the second slow cycle the relay of the line to be selected is excited. Be it assumed that this relay is the relay which switches over the contacts 506 and 528. The system is then ready for controlling the setting of the display units of the selected second line. During this setting operation the slow synchronization circuit, which is only necessary for controlling the line selection should not become operative any more, because this would cause delay as well as resetting of the selection relays. In order to prevent such operation a trigger circuit 235 is present, which only in its reset condition applies a high potential to one of the input circuits of the "and" circuit 236 in order to permit this "and" circuit to pass the pulse $S_3$ which initiates the slow synchronizing cycle by setting the trigger circuit 239. The trigger circuit 235 is reset when, as will be elucidated later on, at the end of the complete setting operation of the board the trigger circuit 207 is reset in order to start the operation of the extraneous synchronization circuit. Only then is it possible for the slow synchronization circuit to be started. If, however, after the setting of the second set of relays 419 the 4th slow synchronizing pulse $T_4$ is applied to the input circuit 228 of the "and" circuit 233 whilst the programming wire $P_2$ connected to the input circuit 229 has a high potential, this pulse passes the "and" circuit, and sets the trigger circuit 235. No more slow synchronizing cycles can then be initiated by the selection of the first and second line of the core matrix because one of the input circuits of the "and" circuits 236 remains at a low potential.

In order to make preparations for the first of a number of comparison cycles following now during the last cycle of the slow synchronization circuit the trigger circuit 273 is reset. The high potential, which during the reading of the second line of the matrix is applied to the second programming wire $P_2$ reaches by way of the input circuit 270 the "and" circuit 272, thus permitting the 3rd rapid synchronizing pulse $S_3$ which is applied to the input circuit 271 of this "and" circuit to reach the trigger circuit 273 and reset it. The object of the cycles following now is to establish whether certain display units have already reached their eventual position registered in the storage system. Such comparison cycles should be effected in the last part of the interval between two successive stepping pulses applied to the stepping magnets, when the code contacts, in any case, are in rest. Furthermore the rapid internal synchronization system must be prevented from beginning a cycle before the slow internal synchronization has completed its last cycle in which it controls the setting of the relay group 419. The circuits connected to the "and" circuit 267 ensure that the above conditions are met. In the example described the stepping pulses for the stepping magnets are obtained by rectifying an alternating current of 50 cycles per second. This current is supplied by way of conductor 260 to the rectifier 261. The pulses supplied by the rectifier flow on the one hand by way of the branch 259 to the conductor 503 and the various stepping magnets and on the other hand to the limiting circuit 262, which transforms them into substantially rectangular pulses. A differentiating circuit 263 differentiates these pulses and the pulse obtained by differentiation of the trailing edge of the pulse, occurring at the end of the interval of 10 milliseconds in which a stepping pulse occurs, triggers a monostable trigger circuit 264 causing it to produce a pulse with a duration of 5–7 milliseconds. This pulse is differentiated by the circuit 265 and the pulse derived from its trailing edge triggers a second monostable trigger circuit 266 causing it to produce a very short pulse. This pulse is applied to the upper input circuit of the "and" circuit 267. It will, however, only be able to pass this "and" circuit if the two other input circuits have a high potential, that is if the trigger circuits 239 and 250 are reset. For the time being the trigger circuit 239 is set, however, for the same pulse $S_3$ which caused the resetting of the trigger 273 has set the trigger circuit 239 in order to start the slow synchronization system. This system now performs a cycle in the way described above during which the relay group 419 is set. The second slow synchronizing pulse $T_2$ in this cycle sets the trigger circuit 250. The pulse $T_3$ in the same cycle resets the trigger circuit 239, so that the conductor 268 connected with the "and" circuit 267 obtains a high potential. Nevertheless, the short pulses produced by the flip-flop circuit 266 will not be able to pass this "and" circuit, because, for the time being the trigger circuit 250 continues to apply a low potential to the conductor 251. If, however, the cycle is completed and the moment is reached at which the second pulse $T_2$ of the slow synchronization system in the next cycle would have been supplied, the trigger circuit 250 is reset again, so that the conductor 251 obtains a high potential, and the "and" circuit 267 can become conductive. The next short pulse received from the flip-flop circuit 266 then sets the trigger circuit 273 thus initiating a number of cycles of the rapid internal synchronization system, for the trigger circuit 273 will, for the time being not be reset again, as the input circuit 270 connected to the programming wire $P_2$ remains for the time being at a low potential during a complete programming cycle of the storage system 338. Because of the operation of the chain of elements connected to the upper input circuit of the "and" circuit 267 these cycles start long enough after the last stepping pulse for the parts of the display units to be settled and long enough before the next stepping pulse to permit a complete cycle of comparison operations for all units on the selected line to be performed before they take their next step.

Now a comparison cycle will be described. Be it assumed, that the selection relay, which switches over the contacts 506 and 528 are excited. The windings of the stepping magnets of the display units on the line of the display board to which the conductor 508 is allotted are then connected to the source of stepping pulses. The first pulse of the first cycle of the rapid synchronization switches the ring counter 315 over to position 3 and, passing through the "or" circuit 353 resets all trigger circuits in the register 352. At the moment of occurrence of the second rapid synchronizing pulse $S_2$ the contents of the third line of the core matrix is transferred to the register 352.

The programming wire $P_3$ has a high potential in the third position of the ring counter. It is connected to the upper input circuit of the "and" circuit 519, so that the second synchronizing pulse $S_2$, which is applied to input circuit 520, can reach the conductor 516 causing all trigger circuits (such as 501, 513 . . .) for controlling the transistor switches in the circuits of the stepping magnets to be set.

This causes all transistor switches such as 502 and 514 to become conductive, so that the next stepping pulse can flow through the windings of the magnets. Only from this moment on the changing contents of the flip-flop register 352 is able to influence the setting of the display units of the display board. Because of the moment in the stepping pulse cycle at which the first comparison cycle is started for the time being no stepping pulse occurs. The conductor 533 is connected to the programming wire $P_3$ and consequently has a high potential when the counter is in its third position so that the "and" circuits $a$, $b$, $c$, $d$, $f$ and $g$ in the multiple wires 525 are conductive and the potentials applied to the multiple wires 525 by the code contacts of the code transmitter of the first display unit in the selected line are able to reach the code converter 536 by way of the "and" circuits mentioned above and the "or" circuits 532 whilst the contents of the third line in the matrix is stored in the register 352. The code converter converts the signal into a signal in teleprinter code. The converted signal is applied to the comparison circuit 464 by way of the cable 537. This comparison circuit also receives, by way of the channel 430, 355, 354, the signal registered in the register 352. If no equality is established, nothing happens, but if equality is established the comparison system applies a high potential by way of conductor 455 to the left-hand input circuit of the "and" circuit 457 so that the next third rapid synchronizing pulse $S_3$, which is applied to the input circuit 456 of the said "and" circuit will pass this circuit and reach the right-hand input circuit of each of the "and" circuits 500, 512, etc. by way of the conductor 458, 538, 517. The pulse received by way of this conductor will, however, only be able to pass that "and" circuit in the latter group of "and" circuits, the other input circuit of which is connected to the programming wire carrying a high potential at that moment. During the comparison cycle described this is the "and" circuit 500, so that the pulse received from the "and" circuit 457 resets the trigger circuit 501, which controls the supply of stepping pulses to the first column. The pulse, resulting from the established equality consequently can reset the trigger circuit 501 and block the transistor switch 502 before the first stepping pulse is supplied to the display unit.

During the next cycle of the rapid synchronization performed whilst the ring counter is in position 4 the upper input circuit of the "and" circuit 512 as well as the conductor 534 have a high potential, so that the "and" circuits in the group of multiple wires 526 apply the signal corresponding to the position of the second display unit in the selected line to the code converter by way of the "or" circuits 532. This causes the said signal to be compared with the setting of the register 352, which now corresponds to the contents of the 4th line of the core matrix. These comparison cycles are continued until the second line in the ring matrix is reached again. All the registrations still present on lines on which no information is written during the reception of the last information are ignored because no corresponding display units are present on the selected line. As soon as the second line is reached again the programming wire $P_2$ applies a high potential to the input circuit 270 of the "and" circuit 272. Consequently, the next third rapid synchronizing pulse $S_3$ applied to the input circuit 271 of the said "and" circuit, is able to pass it and to reset the trigger circuit 273, which then applies a high potential to the upper input circuit of the "and" circuit 278 thus permitting the fourth rapid synchronizing pulse, received by way of the conductor 276 to pass this "and" circuit and to reset the trigger circuit 281. This puts an end to the operation of the rapid synchronization system S in the way described above. A short moment later a stepping pulse is supplied, which causes all stepping magnets, the transistor switches 502, 514 etc. of which are still conductive to be excited, so that their display units take a step. After a certain delay caused by the various circuit elements described above, but before the next stepping pulse is received the flip-flop circuit 266 supplies a short pulse again, which passes the "and" circuit 267 because the two trigger circuits 239 and 250 are still in the reset condition, and sets the trigger circuit 273. This initiates the next comparison cycle during which the comparison system establishes whether any of the display units by taking a step has reached its desired setting. As soon as it may be assumed, that all display units have reached the setting corresponding to the information stored in the matrix core memory, the operation of the system must be interrupted, and the external synchronization system made operative, so that information from the common channel may be received again. In the embodiment described this occurs as soon as it is established that during a certain comparison cycle the comparison system has in no case established inequality. For this purpose the system contains the switching elements shown in the lower part of FIGURE 4. The pulse $S_2$, which flows through the "and" circuit 519 and which sets the trigger circuits such as 501 for controlling the stepping pulses supplied to the stepping magnets, also flows through conductor 539, 447 to the trigger circuits 448 and 443.

It resets the trigger circuit 448 and sets the trigger circuits 443. The latter circuit is reset as soon as the line in the storage matrix 338 is reached on which the clearance signal SL is written, for when this signal is transferred to the flip-flop register 352 the code recognizer 357 applies a high potential to the upper input circuit of the "and" circuit 442 by way of conductor 359 and the cables 330, 428, 518, 429, so that the pulse $S_3$ is able to reach the trigger circuit 443 and to reset it. The voltage produced by the comparison circuit 464 as a result of its comparison operations is applied to an inversion circuit 454 which, at the moment a comparison is performed, applies a high potential to the conductor 446 if inequality is established. As long as the trigger circuit 443 is still in the set condition, i.e. as long as the line on which the clearance signal is written is not reached and therefore comparisons with significant registrations in the matrix storage are performed, this high potential will permit the fourth rapid synchronization pulse $S_4$ which is applied at the input circuit 444 of the "and" circuit 445 to pass this "and" circuit and to set the trigger circuit 448. If no inequality is established the trigger circuit 448 is still in the reset condition and the left-hand input circuit of the "and" circuit 449 still has a high potential when in this way all lines of the matrix storage on which significant signals are written have been selected and the line on which the clearance signal is registered is reached. Then the code recognizer 357 by way of output circuit 359 applies a high potential to the input circuit 450 of the "and" circuit 449, so that the third rapid synchronizing pulse, which is applied to the input circuit 451 will be able to pass this "and" circuit 449 and to set the trigger circuit 452.

Obviously this is only possible if after a complete series of comparison cycles in which no inequality has been established, the line in the core matrix on which the clearance signal is registered is reached and moreover, the third rapid synchronization $S_3$ occurs. This pulse will then be able to pass the "and" circuit 449 and to set the trigger circuit 452 which, by way of output circuit 463 applies a high potential to the input circuit 204 of the "and" circuit 206. The second pulse $S_2$ in the next cycle of the internal rapid synchronization will then be able to reach the trigger circuit 207 and to reset it. This causes the conductor 209 and one input circuit of the "or" circuit 275 to obtain a high potential, so that the central input circuit of the "and" circuit 278 obtains a high potential, which, in the way already described, initiates the termination of the operation of the rapid synchronization system S at the end of the current cycle. The resetting of the trigger circuit 207 applies high potential by way of "or" circuit 275 to the upper terminal of "and" circuit 278, which, in the way described above causes the stopping of the operation of the rapid synchronization system at the end of its cycle. It moreover causes one input circuit of the "and" circuit 211 to obtain a high potential, and as soon as the operation of the rapid synchronization has come to an end, which can be derived from the fact, that the trigger circuit 286 is in the reset condition, the conductor 210 and the input circuit of the "and" circuit 211 connected to it, obtain a high potential too, so that the fifth external synchronizing pulse can reach the left-hand input circuit of the trigger circuit 214 by way of the "and" circuit 211 and set this trigger circuit. This causes the 4 "and" circuits 225 in the first 4 output circuits of the external synchronization system to become conductive. Moreover, the upper input circuit of the "and" circuit 217 obtains a high potential, so that the second external synchronizing pulse can pass this "and" circuit and set the trigger circuit 219. This trigger circuit by way of conductor 221 causes the two "and" circuits 226 to become conductive, so that all the output circuits of the external synchronization system are able to supply pulses, and the display board is ready again for receiving information from the transmitter system.

It is the object of the trigger circuit 443 to restrict the search for the occurrence of inequality to the interval in which these lines of the matrix are read on which information has been written during the last reception of information. This prevents the setting of the trigger circuit 448 as the result of the application of a registration left behind on lines in the matrix on which during the setting of a short line on the board no new information has been written, to the comparison circuit 428 at a moment at which the display board can not supply any information because no display unit is present in the selected line and the column corresponding to the said line in the matrix. As soon as the line in the matrix is reached on which the clearance signal is written the code recognizer 357 applies a high potential to the conductor 359. This conductor passes through the programming cable 330, 428, 518, 429 to the upper input circuit of the "and" circuit 442. As soon as under these circumstances the third internal synchronizing pulse $S_3$ is applied to the input circuit 441, i.e. before the end of the cycle of the rapid synchronization in which the clearance signal was transferred to the flip-flop register 352 and before the fourth rapid synchronizing pulse can set the trigger circuit 448 because of the inequality established when the clearance signal is applied to the comparison circuit, the "and" circuit 442 becomes conductive and the trigger circuit 443 is reset. This occurs after every comparison cycle in which the position of display units on a line is compared with the registrations in the matrix. After the resetting of the trigger circuit 443 the "and" circuit 445 cannot become conductive any more and the trigger circuit 448 can no longer be set as a result of the establishment of inequality. The beginning of the next series of comparisons causes the trigger circuits 443 to be set again at the same moment as the trigger circuits such as 501, which control the stepping circuits.

The trigger circuit 452 should only be in the set condition after complete equality has been established. It must consequently be reset before the starting of the setting of another line of the board. In the example described this is effected immediately after it is set as a consequence of the fact that by resetting the trigger circuit 207 it has completed its task. When the trigger circuit 207 is reset, the conductor 209 obtains a high potential. The potential of this conductor is applied to the "and" circuit 459 by way of conductors 302, 316 and the cables 330, 428, 518, 429. It is true, that the resetting of the trigger circuit 207 puts an end to the operation of the rapid synchronization system, but this synchronization system completes its cycles and consequently still provides once again a pulse $S_4$, which is applied to the second input circuit of the "and" circuit 459, and thereby causes the trigger circuit 452 to be reset.

In the interval, however, during which the comparison cycles are performed, the trigger circuit 207 is set and the potential of the upper input circuit of the "and" circuit 459 is, therefore low, so that the synchronizing pulse $S_4$ has no influence upon the trigger circuit 452.

The pulse, which is applied by the trigger circuit 452 to the output circuit 463 is also applied to the wire with the index E in FIGURE 5 and causes in this way the resetting of the trigger circuit 501 etc., which were not reset during the previous series of cycles. These trigger circuits are the circuits allotted to columns in which on the selected line no display units are present. In this way it is prevented that in the future whilst setting a longer line the display units in the said columns will start too early. The said wire E is connected to "or" circuits in the control circuits for resetting the said trigger circuits.

If for some reason a display unit cannot reach the required position, or is unable to send back the code elements corresponding to its setting, a cycle during which no inequality is established, will never occur. The system then continues to operate and to effect comparison cycles. In the system described special measures are taken for giving an alarm under these circumstances. For the purpose of giving an alarm signal under these circumstances a bi-stable trigger circuit 433 and a mono-stable circuit 436 are present. The trigger circuit 433 is set by the fifth extraneous synchronizing pulse, which is applied to one of the input circuits of the "and" circuit 431 if at the same time the potential of the other input circuit of this "and" circuit receives a high potential from the code recognizer 357 by way of the conductor 359 because this recognizer has established that the signal SL has been registered in the flip-flop storage 352, that is when the transmission of information to the display board has just been completed and the board can start the setting of its units. Only under these circumstances can this trigger circuit be set. It is reset after a very short interval when the second line in the magnetic matrix storage is selected again. Before this occurs, however, the monostable trigger circuit 436 is set by the combined influence of the high potential applied to the input circuit 434 of the "and" circuit 435 by the first programming wire $P_1$, when the first line in the matrix storage is selected and the high potential applied to the upper input circuit by the trigger circuit 433 in the set condition.

The mono-stable trigger circuit 436 resets itself after an interval which is long enough for the normal setting operation of a line of the display board to be effected well within it. An alarm signal is given at the output circuit 438 of the "and" circuit 437 when the following conditions are met:

(1) The trigger circuit 436 is reset, which means that the setting of the line should be ready.
(2) The trigger circuit 448 is set, which means, that during the last comparison cycle inequality has been established.
(3) The pulse $S_3$ is applied to the input circuit 440 of the "and" circuit, which means, that comparison cycles are performed.
(4) The code recognizer 357 applies a high potential by way of line 359 to the input circuit 439 of the "and" circuit, because a comparison cycle has just been completed.

The last condition prevents an untimely alarm.

The way in which the synchronizing pulses are generated will be elucidated by describing the system for supplying the rapid internal synchronizing pulses, which is shown in detail in FIGURE 2. A relaxation generator 288 generates pulses. The duration of these pulses is equal to the duration of the pulse interval.

Be it assumed, that at a given moment the two trigger circuits 294 and 295 are in the reset condition, and that at that moment the generator 288 produces a pulse. The conductor 296 IV has a high potential at this moment because trigger circuit 295 is in the reset condition, so that the said pulse will be able to set the trigger circuit 294 by way of the "and" circuit 290. This causes the conductor 296 I and the left-hand input circuit of the "and" circuit 292 to obtain a high potential. During the pulse interval the inverter 289 applies a high potential to the upper input circuit of this "and" circuit so that the trigger circuit 295 is set. This causes the conductor 296 III as well as the right-hand input circuit of the "and" circuit 291 to obtain a high potential. The next pulse received from the relaxation generator 288 will then be able to reset the trigger circuit 294 by way of the "and" circuit 291. During the next pulse interval the inverter 289 produces a pulse, which is able to pass the "and" circuit 293 and to reset the trigger circuit 295, because the right-hand input circuit of the said "and" circuit is connected to the conductor 296 II, the potential of which has become high as a result of the resetting of the trigger circuit 294. The original condition of the system is then restored. These cycles are continuously repeated. The conductors 296 I, II, III and IV are arranged in a matrix with the wires 269/1, 2, 3, 4, by way of which the synchronizing circuit supplies its pulses. Each conductor in the group 296 is connected by way of two diodes arranged as an "and" circuit with two of the conductors in the group 296. In the first interval described above the conductors 269 I and IV have a high potential causing the first conductor in the group 269 to obtain high potentials. In the first pulse interval the conductors I, III in the group 296 have a high potential, so that conductor 2 in the group 269 obtains a high potential. During the second pulse the conductors II, III in the group 296 have a high potential, causing the conductor 3 in the group 269 to obtain a high potential, and in the second pulse interval the conductors II, IV in the group 296 have a high potential, causing the conductor 4 in the group 269 to obtain a high potential. It is obvious, that the "and" circuits in the matrix are not shown completely and that, for instance, the resistances by means of which the wires in the group 269 are connected to a voltage source are not shown.

The circuits used for establishing whether the various display units have already reached their desired positions can also be used in order to establish in similar comparison cycles whether the selection of the line has actually been effected correctly. A system in which such a check on the selection is effected, is obtained if in the complete circuit FIGURE 6 is inserted between the FIGURES 4 and 5. The cable 614 carries the various programming wires to the cables 518 in FIGURE 5, whilst the cable 615 is the continuation of the cable 518. The cable 618 is the connection between the comparison circuit 464 and the cable 540 to which signals in teleprinter code are applied by the code converter 536. The conductors 623 and 624 are the continuations of the conductors 538 and 539 in FIGURE 5. By means of the system shown in FIGURE 6 the excited line selecting relay transmits back the two figures by means of which it was selected. This is effected by means of two matrixes. Each of these two matrixes signals back in teleprinter code one of these figures. Each matrix possesses 10 horizontal wires such as 601 or 607. Each of these wires is allotted to one of the the figures 0–9. Each of the line selecting relays possesses two special contacts for signalling back its number. The back side of such a contact is connected to a negative potential and the front side to zero potential. One of these contacts of a line selecting relay is connected by way of a diode to that wire in the matrix shown at the left-hand side of the figure, which is allotted to the first figure in the number by means of which the relay was selected. The other contact is connected by way of a diode to that wire in the second matrix, which is allotted to the second figure in the said number. If, e.g., the relay 12 is selected it switches over the contacts 602 and 608. The contact 602 connects in the left-hand matrix which must transmit the first figure, the wire 601, which is allotted to the figure 1, to earth, the diodes between this wire and the other contacts connected to this wire blocking the way to negative potential. The contact 608 connects in a similar way zero potential to the conductor 607 which is allotted to the figure 2 in the other matrix. The vertical wires in these two matrixes correspond to the bits in the signals to be transmitted. The first 5 conductors determine the 5 significant bits which indicate the figure to be transmitted, whilst the 6th wire transmits the shift-key signal (in this case an unvariable bit and always indicating: figures). The 7th wire effects the transmission of the 7th element used for checking purposes. Each of the horizontal wires in the matrix is connected by means of a diode such as 603 to each of the vertical wires allotted to the bits which must be of a certain type, e.g. 1 for the transmission of the figure to which the said horizontal wire is allotted. The vertical wires are connected by way of resistances not shown in the figure to a source of negative potential, so that the diodes connected to such a wire form an "or" circuit. As soon as a line selecting relay is excited the bits to be transmitted in order to signal back the number of this relay appear at the input circuits of the groups of "and" circuits 604 and 609.

In order to elucidate the operation of the checking system a concise description will now be given of the operation of the display board when it comprises the circuit shown in FIGURE 6. The writing of the information in the ring matrix storage is effected in the way already described above. Because the rapid synchronization is non-operative during this writing neither the setting circuits for the display units nor the checking system can become operative. Then the ring counter, controlled by the rapid synchronization, passes over all the lines in the matrix storage in which no information is written, after which the selection relay groups 409 and 419 are set. This causes the line selection relay to be excited. During all these operations effected before the line selection relay is excited the two matrixes still supply bits which do not correspond to the selection to be performed. The bistable trigger circuit 235 is, however, during all these operations, in the reset condition, so that the input circuit 625 has a low potential and the "and" circuit 616 cannot become conductive, so that the checking circuit shown in FIGURE 6 remains inoperative, as will be shown later. At the end of the slow cycle during which the second set of selecting relays is set the trigger circuit 235 is set, as has been described above. This causes the slow synchronization system to remain inoperative during the rest of the setting operations of the system, whilst, moreover, the input circuit 625 of the "and" circuit 616, which is connected to the conductor 234 in FIGURE 2 obtains a high potential. This makes the checking circuit of FIGURE 6 operative.

As has been described above after these selection operations the rapid synchronization system is put into operation again so that a series of comparison cycles is performed. During these cycles first the settings of the display units are compared with the signals stored in the matrix storage. Then the ring counter 315 passes over all the lines on which no information has been written and stops on line 2 of the matrix because of the fact that the operation of the rapid synchronization system is interrupted in the way described above. When near the end of the first series of comparison cycles the first line, on which the first figure of the indication of the line on the display board is written, is read, the first programming wire $P_1$ obtains a high potential, so that the conductor 605 and all the right-hand input circuits of the "and" circuits 604 obtain a high potential. The potentials, indicating the bits of the first figure which are applied to the vertical wires 600 of the left-hand matrix by the switching over the contact 602 of the line selecting relay will then be able to pass the "and" circuits 604 and reach the comparison circuit 464 by way of the cable 612 and the "or" circuit 617. If the selection has been correctly effected, the comparison circuit 464 applies a high potential to the conductor 455. This high potential is applied by way of "and" circuit 457 and conductor 458 to the "and" circuits such as 500 connected to this conductor. This has no effect, because no programming wire applies a high potential to the second input circuit of any of these "and" circuits. Inversion circuit 454, moreover, applies a low potential to the conductors 460 and 619 as long as the conductor 455 has a high potential, so that the "and" circuit 616 cannot become conductive. If on the other hand the signal supplied by the left-hand matrix does not correspond to the signal written on the first line of the ring matrix storage, which signal at that moment is registered in the flip-flop register 352, then the output circuit 455 of the comparison circuit 464 remains at a low potential, so that the output circuit of the inversion circuit 454 applies a high potential to the conductor 619 and the left-hand input circuit of the "and" circuit 616. The programming wire 605 also has a high potential, so that by way of the "or" circuit 611 the upper input circuit of the "and" circuit 616 obtains a high potential. The right-hand circuit 625 also has a high potential because during the rest of the operations performed by a system the trigger circuit 235 is set, so that its output circuit 234 applies a high potential to the input circuit 625. When under these circumstances the left-hand input circuit 626 receives the third rapid synchronizing pulse $S_3$, this pulse is able to pass the "and" circuit and to reach the trigger circuit 620. As long as the system is operating correctly, this trigger circuit is in its reset condition, because it is reset by means of a press button contact 621 when a defect has been repaired. An incorrect selection, however, causes the trigger circuit 620 to be set again. This causes the conductor 622 to obtain a low potential, so that the electronic switch 541 situated in the stopping pulse supply conductor 503 becomes non-conductive. In spite of the incorrect selection the setting of the incorrectly selected line will consequently remain unchanged. During the reading of the second line the programming wire 610 obtains a high potential, so that the right-hand input circuits of the "and" circuits 609 obtain a high potential, and the bits of the signal which are applied to the vertical wires 606 of the right-hand matrix by way of the contact of the line selecting relay are applied by way of cable 613 and the "or" circuit 617 to the comparison circuit 464. By way of the "or" circuit 611 a high potential applied to the programming wire $P_2$ is also applied to the upper input circuit of the "and" circuit 616, so that in a similar way as in the case of the first line during the reading of the second line an incorrect selection of the line selecting relay causes the setting of the trigger circuit 620. In this case also the change of the setting of the selected line is prevented. The high potential applied to the left-hand output circuit of the trigger circuit 620 after its setting causes an alarm signal 627 to be made operative. The setting of the trigger circuit 620 does not prevent the system from effecting a number of comparison cycles. The display units, however, do not receive stepping pulses any more, so that a cycle in which no inequality is established will never occur. After a suitable delay the alarm circuit with the monostable trigger circuit 436 will then become operative.

What we claim is:

1. In a system for successively supplying pulses to a number of pulse circuits in a cyclic order in which each cycle starts with a pulse supplied to a predetermined first one and ends with a pulse supplied to a predetermined last one of the said pulse circuits, a pulse source and a coincidence circuit with an output circuit and a first and a second input circuit for each pulse circuit, a connection between the pulse source and the first input circuit of the coincidence circuit for each pulse circuit and a connection between the output circuit of each coincidence circuit and the corresponding pulse circuit, a first and a second bi-stable trigger circuit capable of being in a first and a second state and for each of these trigger circuits, a first control circuit for setting it to its first state and a second control circuit for setting it to its second state, as well as a first output circuit and a second output circuit supplying different voltages depending on the state of the trigger circuit, a connection between the first output circuit of the first trigger circuit and the second input circuit of the coincidence circuit connected to the first one of the pulse circuits and to the second input circuits of a number (which may be zero) of coincidence circuits, connected to pulse circuits following on the first pulse circuit, and a connection between the first output circuit of the second trigger circuit and the second input circuit of one of the coincidence circuits not connected to the first output circuit of the first trigger circuit, including at any rate the coincidence circuit connected to the last one of the pulse circuits, and a coincidence circuit with a first and a second input circuit and an output circuit connected with its output circuit to the first control circuit of the second trigger circuit and its first input circuit connected to the first output circuit of the first trigger circuit, as well as a coincidence circuit with a first and a second input and an output circuit with its output circuit connected to the second control circuit of the second trigger circuit and its first input circuit connected to the second output circuit of the first trigger circuit and a connection between the second input circuits of the said two coincidence circuits and a pulse source connected to a coincidence circuit, the second input circuit of which is connected to the first output circuit of the first trigger circuit, and two coincidence circuits each with a first and a second input circuit and an output circuit and a connection between the output circuit of the first one of these coincidence circuits and the first control circuit of the first trigger circuit, as well as a connection between the output circuit of the second one of these coincidence circuits and the second control circuit of the first trigger circuit and a connection between the second input circuits of the said two coincidence circuits and a pulse source connected to a coincidence circuit, the second input circuit of which is connected to the first output circuit of the second trigger circuit, as well as a first system control circuit connected to the first input circuit of the last mentioned first coincidence circuit and a second system control circuit connected to the first input circuit of the last mentioned second coincidence circuit.

2. In a system according to claim 1 an auxiliary bi-stable trigger circuit capable of being in a first and a second state, a first control circuit for setting the auxiliary circuit to its first state and a second control circuit for setting it to its second state as well as a first output circuit and a second output circuit supplying different voltages depending on the state of the auxiliary trigger circuit and a connection between the first output circuit of the auxiliary trigger circuit and a first system control circuit and a connection between the second output circuit of the auxiliary trigger circuit and the second system control circuit.

3. In a system according to claim 1 cooperating with at least one similar system, electronically controlled means for breaking the connection in at least one of the connections between a system control circuit and a control circuit of the first bi-stable trigger circuit, and a control connection for controlling said means between said means and an output circuit of the second bi-stable trigger circuit of at least one cooperating system.

4. In a system according to claim 1 cooperating with at least one similar system, an extra input circuit for each one of the cooperating systems in at least one of the coincidence circuits connected to a control circuit of the first bi-stable trigger circuit and a connection between each one of the said extra input circuits and an output circuit of the second bi-stable trigger circuit of a cooperating system.

5. In a system according to claim 1 cooperating with at least one similar system, an extra input circuit in at least one of the coincidence circuits connected to a control circuit of the first bi-stable trigger circuit, an auxiliary coincidence circuit with an output circuit and as many input circuits as there are cooperating systems, a connection between the said output circuit and the said extra input circuit and a connection between an output circuit of the second bi-stable trigger circuit in each one of the cooperating systems and an input circuit of the auxiliary coincidence circuit.

6. In a system according to claim 1 cooperating with at least one similar system, a connection between an output circuit of the auxiliary bi-stable trigger circuit and that one of the system control connections of a cooperating system which initiates the seating of the trigger circuits of this cooperating system to the states in which they control the coincidence circuits connected to the pulse circuits to suppress the pulse supply.

7. In a system according to claim 1 cooperating with at least one similar system, an electronic switching arrangement in a control circuit for the auxiliary bi-stable trigger circuit and control connections capable of causing the electronic switching arrangement to break the said control connection for the bi-stable trigger circuit, between the said electronic switching arrangement and an output circuit of the second bi-stable trigger circuit of at least one cooperating system.

References Cited by the Examiner
UNITED STATES PATENTS

| | | | |
|---|---|---|---|
| 2,401,780 | 6/46 | Undy | 328—75 |
| 3,067,341 | 12/62 | Hans-Joachim Kunzke | 397—88.5 |

JOHN W. HUCKERT, *Primary Examiner.*

ARTHUR GAUSS, *Examiner.*